US009190794B2

(12) United States Patent
Pao et al.

(10) Patent No.: US 9,190,794 B2
(45) Date of Patent: Nov. 17, 2015

(54) METHOD OF RETAINING A SOLDER MATERIAL TO A SOLDER TERMINAL AND THE SOLDER ASSEMBLY FORMED THEREBY

(71) Applicant: CHIEF LAND ELECTRONIC CO., LTD., New Taipei (TW)

(72) Inventors: Chung-Nan Pao, New Taipei (TW); Sun Wu Chou, Keelung (TW)

(73) Assignee: CHIEF LAND ELECTRONIC CO., LTD., New Taipei (TW)

( * ) Notice: Subject to any disclaimer, the term of this patent is extended or adjusted under 35 U.S.C. 154(b) by 255 days.

(21) Appl. No.: 13/724,303

(22) Filed: Dec. 21, 2012

(65) Prior Publication Data

US 2014/0174821 A1 Jun. 26, 2014

(51) Int. Cl.

| | |
|---|---|
| ***H01R 4/00*** | (2006.01) |
| ***H01R 4/18*** | (2006.01) |
| ***H02G 3/06*** | (2006.01) |
| ***H02G 15/08*** | (2006.01) |
| ***H01R 4/02*** | (2006.01) |
| ***H01R 4/62*** | (2006.01) |
| ***H01R 4/28*** | (2006.01) |
| ***H01R 4/10*** | (2006.01) |
| ***H01R 11/22*** | (2006.01) |
| ***H01R 13/11*** | (2006.01) |
| ***B23K 35/14*** | (2006.01) |
| ***B21D 39/00*** | (2006.01) |
| ***B23K 1/20*** | (2006.01) |
| ***B23K 31/00*** | (2006.01) |
| ***B23K 31/02*** | (2006.01) |
| ***H01R 43/02*** | (2006.01) |
| ***H01R 12/57*** | (2011.01) |
| ***H01R 43/16*** | (2006.01) |

(52) U.S. Cl.

CPC ................ *H01R 43/02* (2013.01); *H01R 12/57* (2013.01); *H01R 43/16* (2013.01); *H01R 43/0256* (2013.01); *Y10T 29/49208* (2013.01)

(58) Field of Classification Search

CPC . H01R 4/20; H01R 12/585; H01R 2203/0415

USPC ................. 174/75 R, 84 C, 84 R, 94 R, 94 S; 439/856, 858, 863, 874, 878; 228/56.3, 228/173.1, 173.2

See application file for complete search history.

(56) References Cited

U.S. PATENT DOCUMENTS

| | | | | |
|---|---|---|---|---|
| 4,802,862 | A * | 2/1989 | Seidler | 439/83 |
| 6,261,136 | B1 * | 7/2001 | Dennis | 439/876 |
| 6,679,709 | B2 * | 1/2004 | Takeuchi | 439/83 |

(Continued)

OTHER PUBLICATIONS

Definition of "abut" from www.thefreedictionary.com Jan. 7, 2015.*

*Primary Examiner* — Chau N Nguyen
*Assistant Examiner* — Roshn Varghese
(74) *Attorney, Agent, or Firm* — Li & Cai Intellectual Property (USA) Office

(57) ABSTRACT

The instant disclosure relates to a method of retaining a solder material onto a solder terminal comprising: a solder terminal and a solder material. The solder terminal includes a first surface, a second surface and a side, and is formed with a retaining hole. The solder material includes a winding portion, and a connection portion which extends on the opposite side from the winding portion of the solder material. The winding portion is arranged to cover the solder terminal along the first surface, the side and then the second surface. In addition, the connection portion is engaged with the solder terminal through the retaining hole and is bent like a hook.

8 Claims, 8 Drawing Sheets

(56) References Cited

U.S. PATENT DOCUMENTS

| | | | | |
|---|---|---|---|---|
| 6,997,757 | B2 * | 2/2006 | Roshardt | 439/751 |
| 7,837,522 | B1 * | 11/2010 | Hoover et al. | 439/876 |
| 2008/0108255 | A1 * | 5/2008 | Peloza et al. | 439/876 |
| 2009/0075528 | A1 * | 3/2009 | Osborn et al. | 439/750 |
| 2010/0122997 | A1 * | 5/2010 | Liu | 228/56.3 |

* cited by examiner

METHOD OF RETAINING A SOLDER MATERIAL TO A SOLDER TERMINAL AND THE SOLDER ASSEMBLY FORMED THEREBY

BACKGROUND OF THE INVENTION

1. Field of the Invention

The instant disclosure relates to a method of retaining a solder material to a solder terminal; in particular, the structure of the solder material and terminal assembled in an adaptor.

2. Description of Related Art

As technology advances, electronic components are becoming increasingly miniaturized. Consequently, soldering precision of miniaturized electronic components is becoming a greater challenge for surface mount technology (SMT).

To retain solder materials onto a solder terminal, one of the conventional approaches includes dipping the solder terminal into a sphere-shaped solder material. However, with the conventional approach, soldering material is highly susceptible to fall off from the solder terminal which leads to poor quality of welding. Another approach disposes the solder material onto the side surface of the solder terminal. However, since the position of the solder materials is susceptible to shift from the solder terminal, welding accuracy is hindered unless a welder resets and fine-tunes the positioning of the solder materials. Based on today's miniaturization trend, soldering accuracy is critical to production especially when electronic components are in close proximity.

To address the above issues, the inventor strives via associated experience and research to present the instant disclosure, which can effectively improve the limitation described above.

SUMMARY OF THE INVENTION

The main purpose of the instant disclosure is to provide a method for retaining a solder material on a solder terminal and adaptor thereof to overcome the aforementioned issues.

In order to achieve the aforementioned objectives, the method of retaining a solder material to a solder terminal includes the following steps: Firstly, a solder terminal is provided which includes a first surface, a second surface opposite to the first surface, and a side connecting the first and second surfaces. Additionally, the solder terminal is formed with a retaining hole. Secondly, a solder material is provided which includes a winding portion and a connecting portion extending from the winding portion. Thirdly, the winding portion is selectively arranged around the solder terminal along the first, second surfaces, and side while the connecting portion through the retaining hole. Finally, the connecting portion is bent towards the winding portion to resemble a hook shaped hanger.

To achieve the method mentioned above, the instant disclosure provides a solder material retained to a solder terminal that includes a first surface, a second surface and a side. Furthermore, the solder terminal is formed with a retaining hole allowing the engagement of solder material. The solder material includes a winding portion and a connection portion extending from the winding portion. The winding portion arranges around the solder terminal along the first surface, the second surface, and the side. Specifically, the winding portion includes a bent portion arranging proximately to the side and the connection portion bends and engages through the retaining hole in a hook-like fashion to retain to the solder terminal.

The instant disclosure further includes an adaptor having an insulator and an assembled soldering terminal interface which extends from the insulator. The assembled soldering terminal interface includes a plurality of solder terminals and a plurality of solder materials.

In summary, the instant disclosure not only efficiently stabilizes the connection between the solder terminal and the solder material, but also significantly reduces the chances of solder material from falling off of the solder terminal. Therefore, with the adaptor mentioned in the instant disclosure, more reliable connection can be more readily attained compared to the conventional solder contact.

In order to further understand the method and structure of retaining a solder material to a solder terminal, the following embodiments are provided along with illustrations to facilitate the disclosure. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplary for the purpose of further explaining the scope of the present disclosure. Other objectives and advantages related to the present disclosure will be illustrated in the subsequent descriptions and appended drawings.

Figure 1:
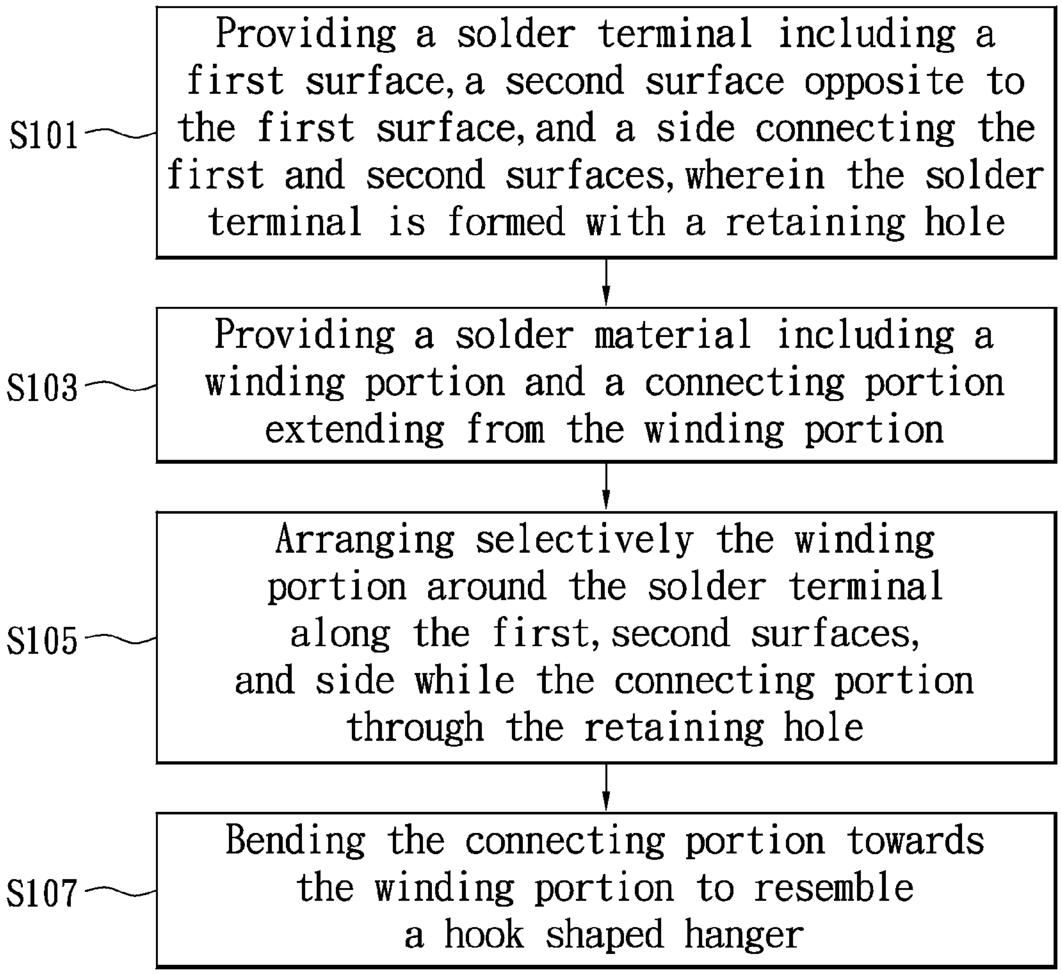
FIG. 1 is a flow chart illustrating a method of retaining a solder material to a solder terminal according to the instant disclosure.

In FIG. 1, the instant disclosure provides the method of retaining a solder material to a solder terminal including the following steps:

S101: Providing a solder terminal 10 including a first surface 11, a second surface 12 opposite to the first surface 11, and a side 13 connecting the first and second surfaces 11, 12. Furthermore, the solder terminal 10 is formed with a retaining hole 14.

S103: Providing a solder material 20 including a winding portion 21 and a connecting portion 211 extending from the winding portion 21.

S105: Arranging selectively the winding portion 21 around the solder terminal 10 along the first, second surfaces 11, 12, and side 13 while the connecting portion 211 through the retaining hole 14.

S107: Bending the connecting portion 211 towards the winding portion 21 to resemble a hook shaped hanger.

Figure 3A:
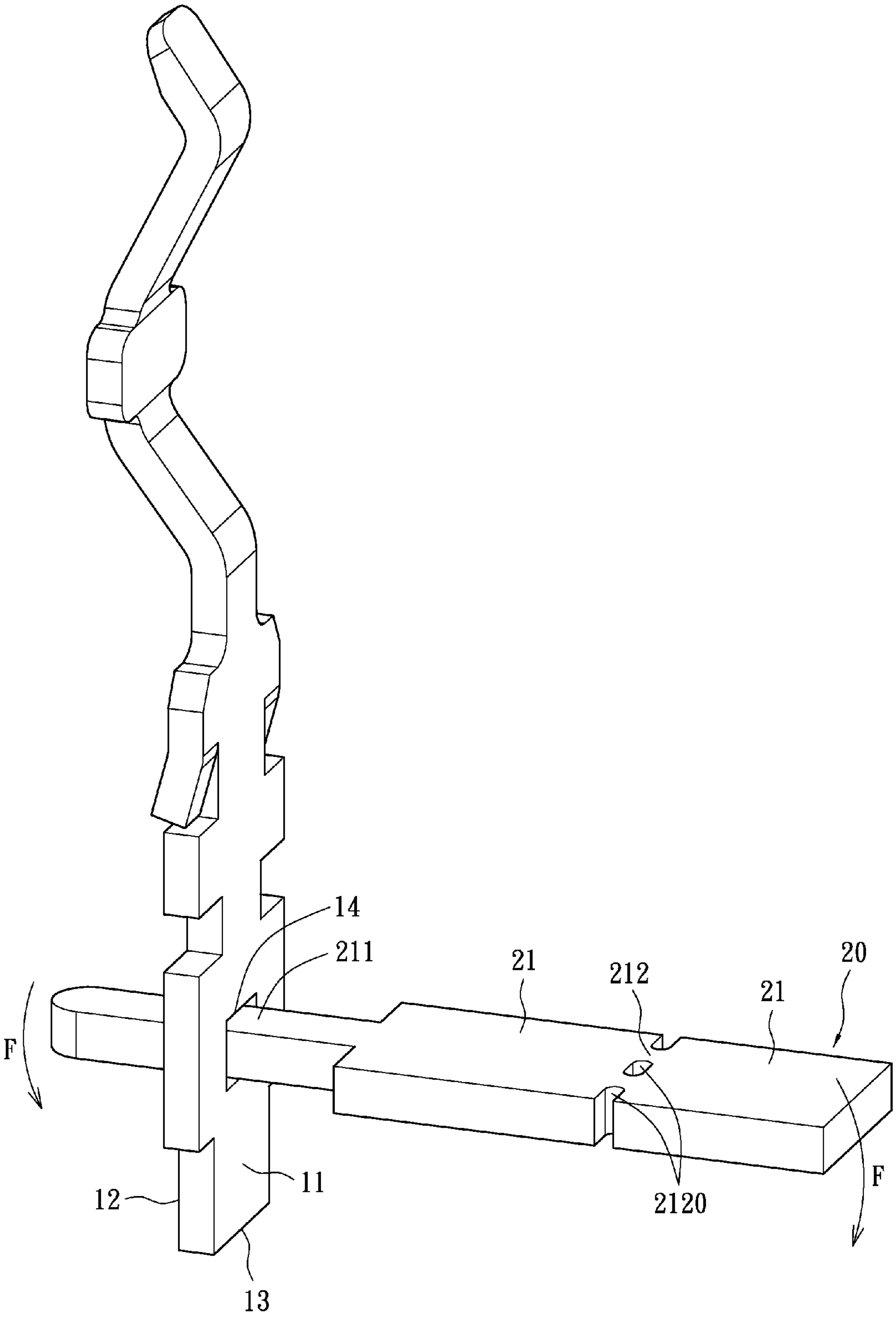
FIG. 3A is a schematic view of a solder material retained on a solder terminal according to a second embodiment of the instant disclosure.
Figure 3B:
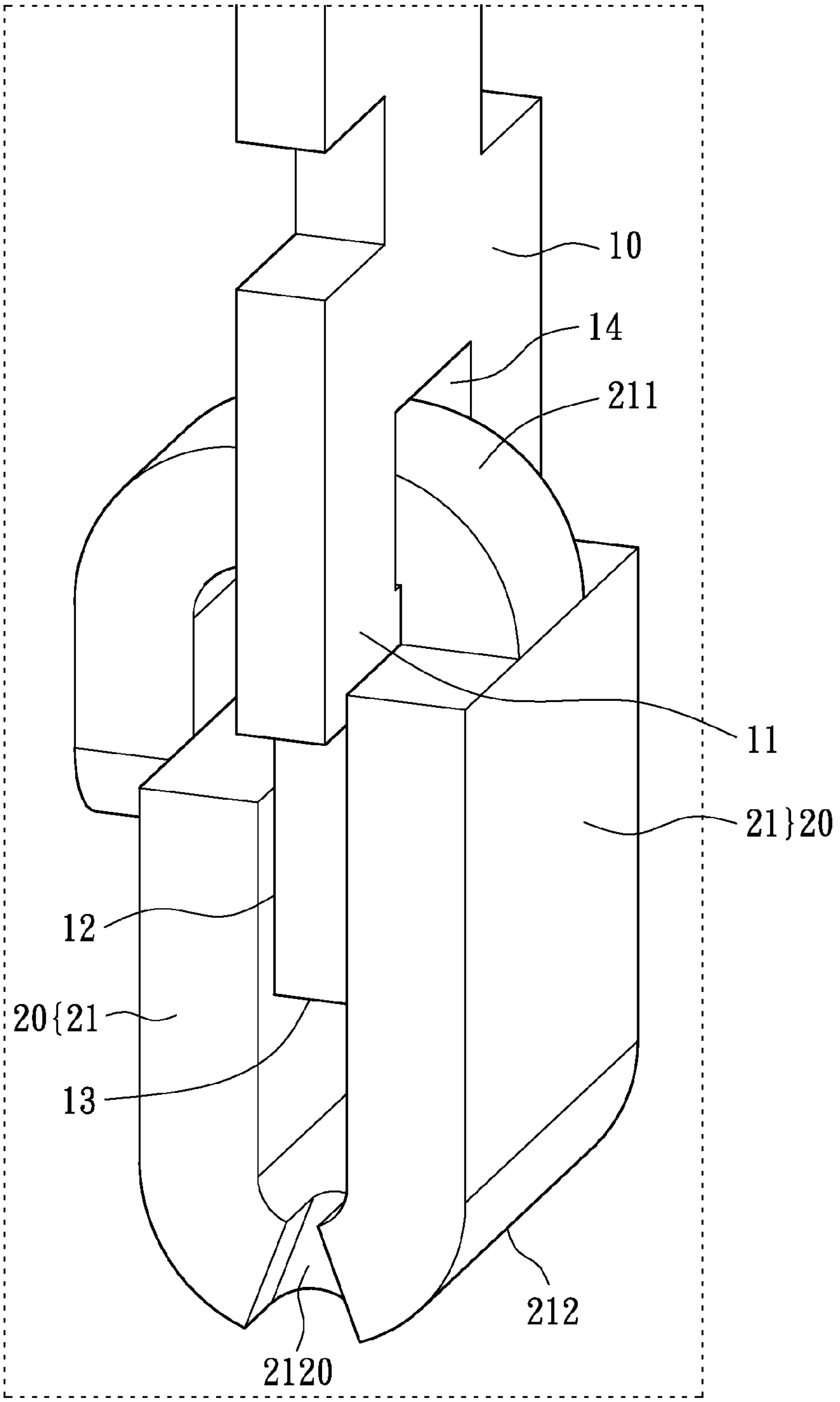
FIG. 3B is a perspective view of a solder material retained on a solder terminal according to a second embodiment of the instant disclosure.
Figure 3C:
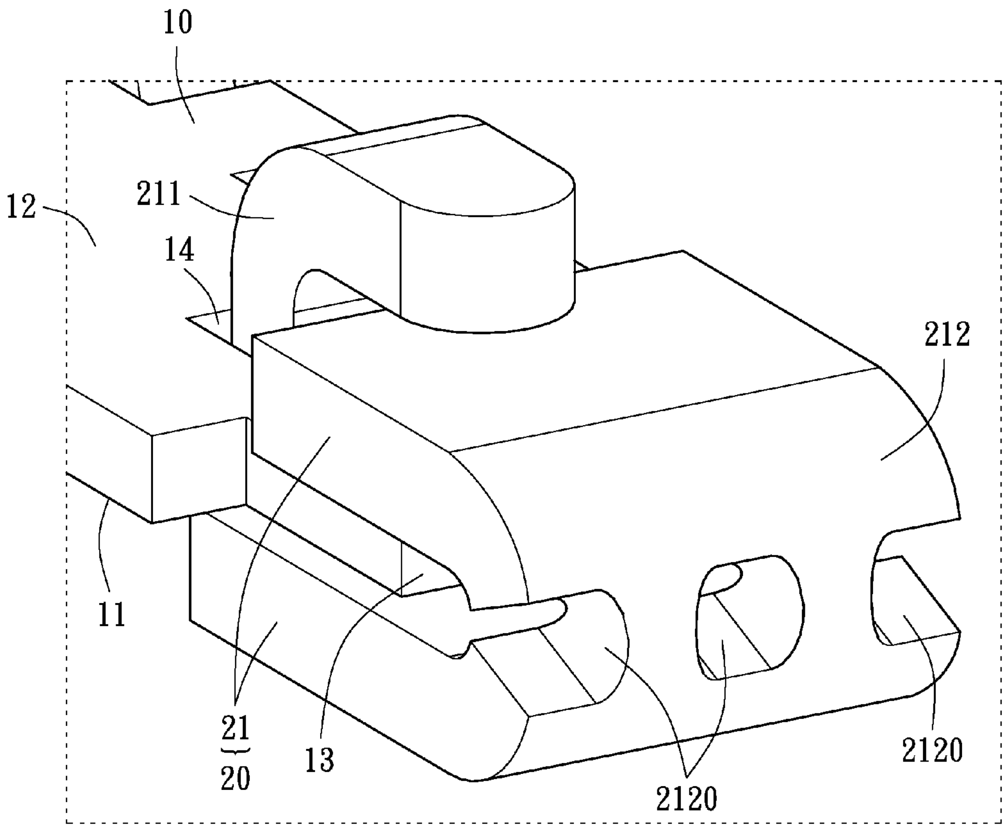
FIG. 3C is an enlarged view of a solder material retained on a solder terminal according to a second embodiment of the instant disclosure.

In the step S105, referring to FIG. 1 in conjunction with FIG. 3B and FIG. 3C, the embodiment depicts the winding portion 21 which includes a bent portion 212 arranging around the side 13. The bent portion 212 may be formed with at least one bent portion groove 2120 which is formed to sufficiently weaken the structural sturdiness of the bent portion 212 without detaching the solder material 20 from the solder terminal 10, hence facilitates the arching of the bent portion 212.

Figure 2A:
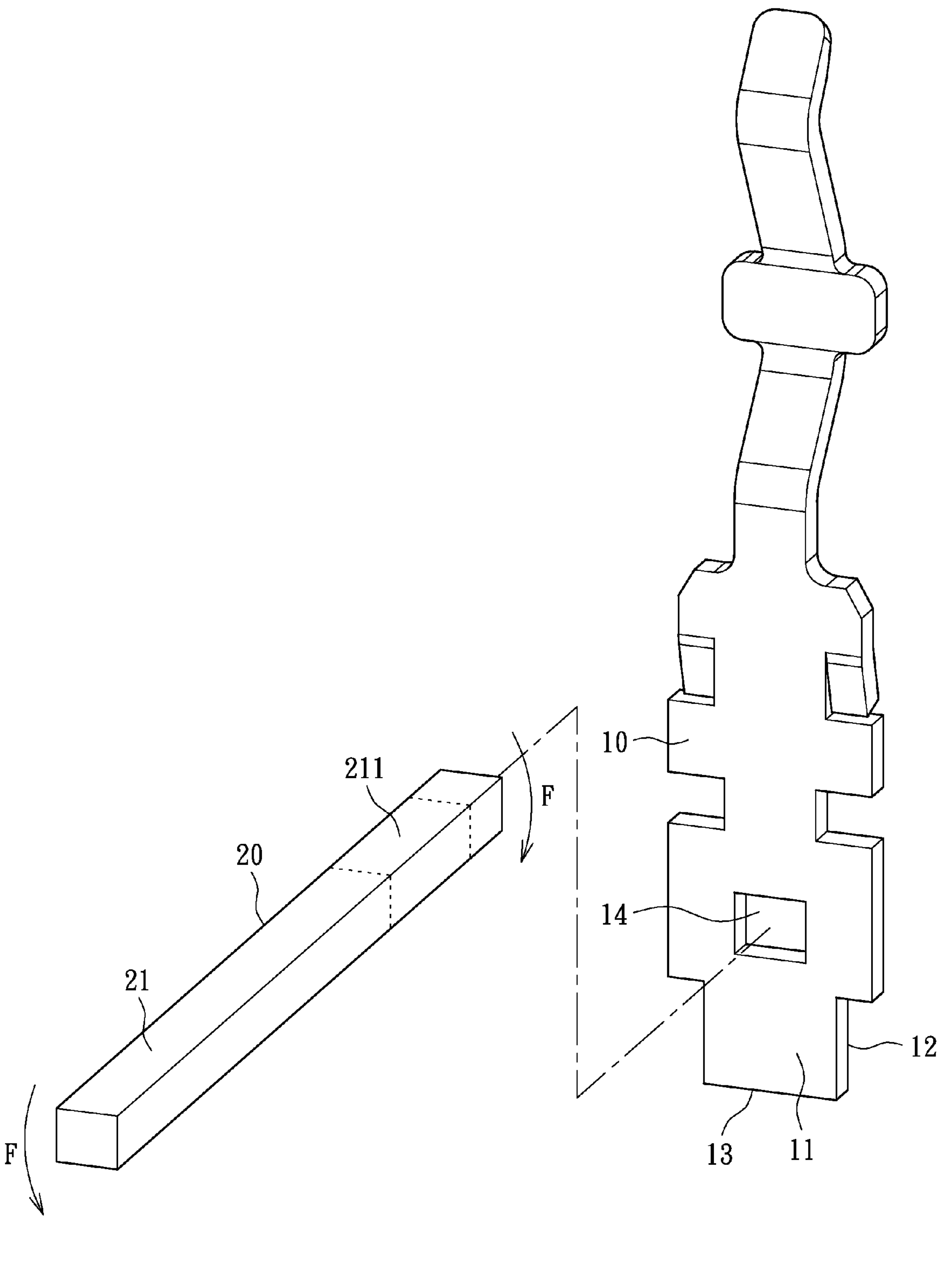
FIG. 2A is an exploded view of a solder material and a solder terminal according to an embodiment of the instant disclosure.
Figure 2B:
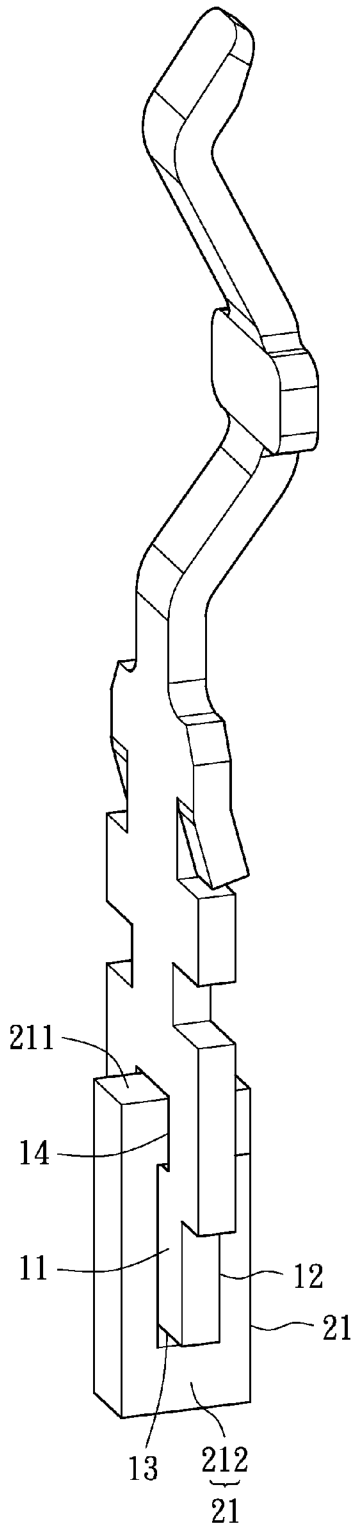
FIG. 2B is a perspective view of a solder material retained on a solder terminal according to an embodiment of the instant disclosure.

As illustrated in FIG. 1 in conjunction with FIG. 2B and FIG. 3B, the bent portion 212 is preferably arranged around the side 13 with a predetermined distance in between. However, the bent portion 212 may contact the side 13 and the distance there-between is not limited thereto.

The connection portion 211 engages with the solder terminal 10 through the retaining hole 14 and abuts the winding portion 21 in a hook-like fashion thus stabilizing the retaining of the solder material 20 on the solder terminal 10.

Please refer to FIG. 2A in conjunction with FIG. 2B. The instant disclosure also provides a solder material retained on a solder terminal including a solder terminal 10 and a solder material 20. The solder terminal 10 includes a first surface 11, a second surface 12, a side 13, and the solder terminal 10 is formed with a retaining hole 14 which communicates the first surface 11 and the second surface 12.

The solder material 20 in the first embodiment has a uniform cross-section throughout the length of the structure and includes a winding portion 21 and a connection portion 211 extending there-from. Furthermore, as shown in FIG. 3A, the winding portion 21 bends towards the connection portion 211 in the direction of an applied force F and wraps around the first surface 11, second surface 12 and side 13 of the solder terminal 10. Furthermore, the connection portion 211 passes through the retaining hole 14 and bends towards the winding portion 21 in the direction of another applied force F. In addition, after bending the connection portion 211 abuts the winding portion 21. As a result, the connection portion 211 resembles a hook-like hanger which securely hangs on the solder terminal 10. However, the way to retain the solder material on the solder terminal is not limited to the instant embodiment provided herein.

Furthermore, the winding portion 21 includes a bent portion 212 which is arranged around the side 13. Specifically, the winding portion 21 is folded toward the first surface 11, further bent onto the side 13, and finally turned onto the second surface 12.

Figure 3D:
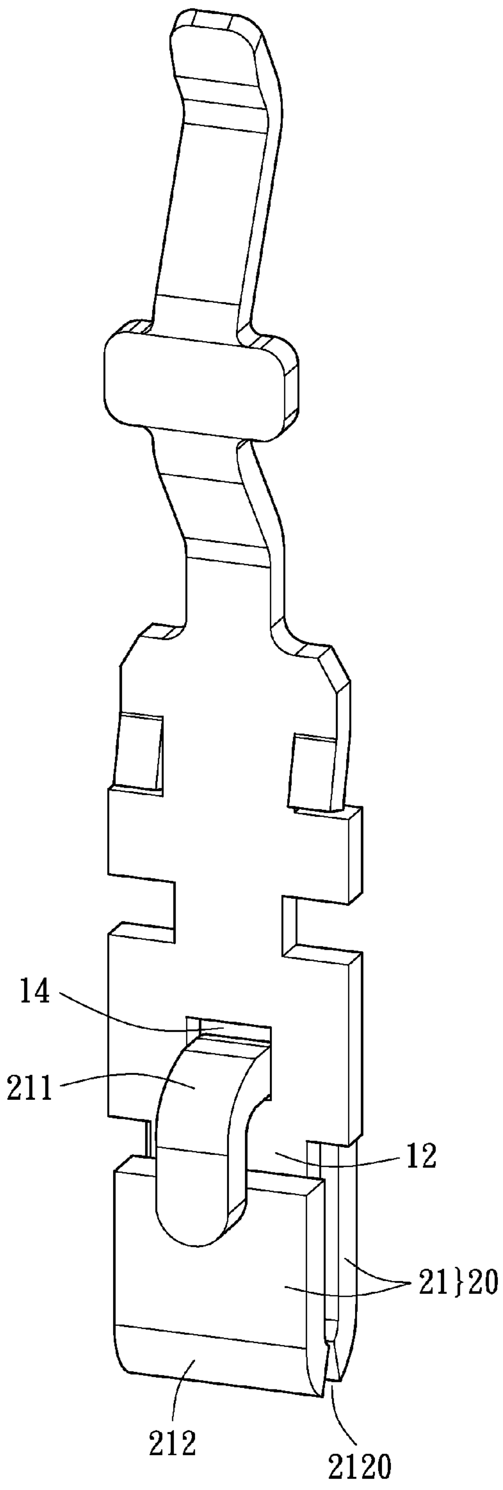
FIG. 3D is another perspective view of a solder material retained on a solder terminal according to a second embodiment of the instant disclosure.

As illustrated in FIG. 2B, the bent portion 212 fittingly wraps around the side 13 therefore allowing the solder material 20 to make contact with the side 13. Consequently, the close contact improves the efficiency of heat transfer onto the solder material 20 and further improves melting of the soldering material 20. FIG. 3B in conjunction with FIG. 3C and FIG. 3D illustrates a second embodiment of the instant disclosure. The second embodiment differs from the first embodiment, specifically, in the shape of the winding portion 21, the connection portion 211, and the bent portion 212 of the solder material 20. Specifically, the second embodiment has varying cross-section area throughout the length of the solder material 20. The preferred shape of the solder material 20 can be a bar or a sheet and the shape thereof is not limited thereto.

In addition, the bent portion 212 may also be formed with a bent portion groove 2120. As shown in FIG. 3B, the volume of the winding portion 21 in the second embodiment is relatively larger in comparison with the first embodiment, and thus the quantity of the soldering materials is relatively greater as well. Due to slightly increasing dimension of the winding portion 21, a stronger force is needed to turn the bent portion 212. Thus, at least one bent portion groove 2120 is formed to facilitate the formation of the bent portion 212.

Furthermore, in the second embodiment, the bent portion 212 may be arranged proximate to the side 13 with a predetermined distance in between to prevent the winding portion 21 from fracture due to the stress cause by sharp bending.

Figure 4:
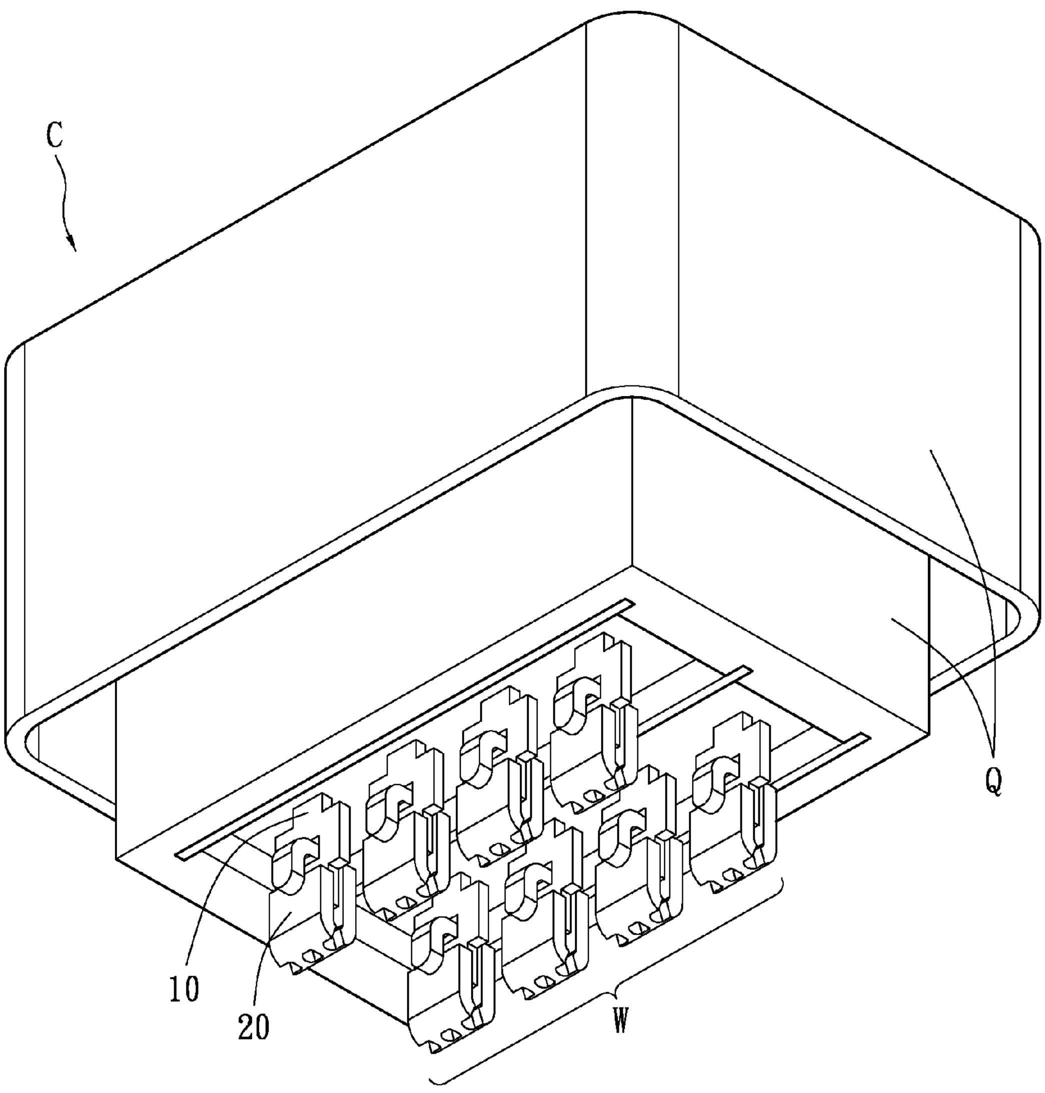
FIG. 4 is a perspective view of an adaptor according to the instant disclosure.

As illustrated in FIG. 4, the instant disclosure further provides an adaptor C which includes an insulator Q and an assembled soldering terminal interface W. The assembled soldering terminal interface W extends from the insulator Q and includes a plurality of the solder terminals 10 and a plurality of the solder materials 20. The insulator Q is preferably an electrically insulated material which also provides grip when a welder holds.

Each of the plurality of the solder terminals 10 has a first surface 11, a second surface 12, and a side 13. Each of the solder terminals 10 is also formed with a retaining hole 14 which communicates the first surface 11 and the second surface 12.

Each of the plurality of the solder materials 20 has a winding portion 21 which passes through the retaining hole 14 and hangs on the solder terminal 10. In details, the winding portion 21 wraps around the solder terminal 10 along the first surface 11, the second surface 12, and the side 13. The winding portion 21 includes a bent portion 212 covering proximately to the side 13. Thus, the assembled soldering terminal interface W is formed on the insulator Q. In addition, the bent portion 212 is preferably arranged around the side 13 with a predetermined distance in between and the distance there-between is not limited thereto.

It is worth mentioned that the adaptor C and the assembled soldering terminal interface W can utilize either form of the aforementioned solder materials.

In summary, the method the structure of retaining the soldering material 20 on the solder terminal 10 with adaptors thereof allows solder materials to be effectively deposited onto the solder terminal. Thus, the instant disclosure reduces space required, eliminates the need for additional positioning adjustments during welding, effectively simplifies welding process and ensures welding efficiency.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. An assembly of a solder terminal and a solder material for being assembled in an adaptor, comprising: a solder terminal including a first surface, a second surface, and a bottom side connecting the first surface and the second surface, the solder terminal formed with a retaining hole, wherein the solder terminal has an elongated shape, and the bottom side is arranged on one of two opposite ends of the elongated shape of the solder terminal; and a solder material including a winding portion and a connection portion, wherein the winding portion has two flat segments and a bent segment connecting the two flat segments, the two flat segments respectively contact the first and second surfaces of the solder terminal, the bent segment is arranged around the bottom side of the solder terminal, wherein the connection portion is extended from one of the flat segments and passing through the retaining hole to abut with another flat segment in a hook like fashion.

2. The assembly according to claim 1, wherein the bent segment portion is formed with a bent portion groove thereon.

3. The assembly according to claim 1, wherein the bent segment is arranged around the bottom side of the solder terminal with a predetermined distance in between, and a gap exists between the connecting portion and a wall defining the retaining hole, thus the solder material is movable with respect to the solder terminal in a direction parallel to the elongated shape of the solder terminal.

4. The assembly according to claim 1, wherein a contact area of the first surface connected to the corresponding flat segment is identical to a contact area of the second surface connected to the corresponding flat segment.

5. An adaptor, comprising: an insulator; and an assembled soldering terminal interface extending from the insulator and including: a plurality of solder terminals, wherein each of the solder terminals has a first surface, a second surface and a bottom side, and defines a retaining hole thereon, wherein each solder terminal has an elongated shape, each bottom side is arranged on one of two opposite ends of the elongated shape of the corresponding solder terminal and is arranged away from the insulator; and a plurality of solder materials respectively hung on the solder terminals, wherein each of the solder materials has a winding portion and a connection portion, wherein at each solder material, the winding portion has two flat segments and a bent segment connecting the two flat segments, the two flat segments respectively contact the first and second surfaces of the respective solder terminal, the bent segment is arranged around the bottom side of the solder terminal, the connection portion is extended from one of the flat segments and passing through the retaining hole to abut with another flat segment in a hook like fashion.

6. The adaptor according to claim 5, wherein each bent segment is formed with a bent portion groove thereon.

7. The adaptor according to claim 5, wherein at each solder material and the respective solder terminal, the bent segment is arranged around the bottom side of the solder terminal with a predetermined distance in between, and a gap exists between the connecting portion and a wall defining the retaining hole, thus the solder material is movable with respect to the solder terminal in a direction parallel to the elongated shape of the solder terminal.

8. The adaptor according to claim 5, wherein at each solder material and the respective solder terminal, a contact area of the first surface connected to the corresponding flat segment is identical to a contact area of the second surface connected to the corresponding flat segment.

* * * * *